United States Patent [19]

Keck et al.

[11] Patent Number: 4,704,201
[45] Date of Patent: Nov. 3, 1987

[54] WASTE PAPER PROCESSING SYSTEM

[75] Inventors: Wilfried Keck, Heidenheim, Fed. Rep. of Germany; Werner Witek, Appleton, Wis.

[73] Assignee: J. M. Voith GmbH, Heidenheim, Fed. Rep. of Germany

[21] Appl. No.: 867,615

[22] Filed: May 27, 1986

Related U.S. Application Data

[63] Continuation of Ser. No. 465,527, Feb. 11, 1983, abandoned.

[30] Foreign Application Priority Data

Feb. 18, 1982 [DE] Fed. Rep. of Germany ....... 3205768

[51] Int. Cl.$^4$ ............................................. B04B 3/04
[52] U.S. Cl. .................................... 209/17; 209/211; 162/4; 210/512.1
[58] Field of Search ................... 209/2, 12, 17, 211; 162/4, 55, 261; 241/28, 29, 46.17; 210/512.1, 512.2

[56] References Cited

U.S. PATENT DOCUMENTS 3,849,246 11/1974 Raymond et al. .................... 162/55
4,334,984 6/1982 Vagac et al. ............................ 162/4

Primary Examiner—Richard V. Fisher
Assistant Examiner—Wanda L. Millard
Attorney, Agent, or Firm—Jeffers, Hoffman & Niewyk

[57] ABSTRACT

A waste paper processing system in which a fibrous suspension of waste paper is cleaned and sorted. The fine cleaning of the suspension is carried out by means of one or more conical centrifuges in a subsidiary stream which branches off from the mainstream and is later recombined therewith. The portion containing the largest content of coarse substances is introduced from a vertical sorter located in the mainstream into the subsidiary stream in which it is sorted and cleaned. There is practically no need to process the waste from the conical centrifuges and the conical centrifuge unit can be designed to be substantially smaller and thus more economical in terms of energy because of the smaller flow of material therethrough.

22 Claims, 2 Drawing Figures

WASTE PAPER PROCESSING SYSTEM

This is a continuation of application Ser. No. 465,527, filed Feb. 11, 1983, now abandoned.

The present invention relates to a system for the processing of waste paper in screen sorting devices for both coarse and fine cleaning, and in a hydrocyclone or hydrocyclones, for example, conical centrifuges or cleaners, in one or more stages for fine cleaning, wherein a suspension of waste paper is sorted and cleaned.

Systems of this kind are generally known having various designs. One such system is described, for example, in H. Mack's book entitled *Altpapieraufbereitung*, 1967, which is incorporated by reference herein, at page 107 and the associated FIG. 91 on page 109. A similar system is described in "Wochenblatt fur Papierfabrikation", 1966, which is also incorporated by reference herein.

In such systems, the waste paper is first disintegrated in a pulper and the fibrous suspension thereby obtained is passed through various processing stages, including, despecking devices, hydrocyclones and flat sorters for preliminary or coarse cleaning purposes. By means of such devices, coarse impurities of both heavy and large-area kinds are largely removed from the fibrous suspension.

In the case of the system described in "Wochenblatt fur Papierfabrikation", 1966, page 396, FIG. 8, after this coarse cleaning, the fibrous suspension first passes to a flotation unit before undergoing further cleaning in a screen sorting device, usually referred to as a vertical sorter, for fine cleaning purposes; and subsequently in an extensive unit made up of hydrocyclones (so-called "cleaners" or conical centrifuges) for further fine cleaning. In this manner, both heavy and large-area impurities, such as foils, are separated. In this system, the conical centrifuge unit is followed by a thickening device in which the consistency of the pulp is increased, and by a bleaching tower. The fibrous suspension is withdrawn in diluted form from the bleaching tower and is thickened to a higher consistency by repeated thickening steps in a further thickening device, for example, a band pressure filter, for storage for further processing such as final cleaning, by stacking in a stacking tower.

As may be gathered from the previously mentioned publications, a flotation unit need not necessarily be provided and the fibrous suspension can be thickened during an earlier stage in order that it can be treated with chemicals in a treatment tower at a higher density of, for example, more than 15%. In such a tower, the material can be subjected to the action of bleaching chemicals and also of chemicals for flotation.

It should also be added that the known systems described in general fall under the generic term waste paper processing. To these extensive waste paper processing systems there is normally connected the so-called constant part which is connected to the stacking tower previously referred to and which contains further conical centrifuges or fine cleaning, i.e., hydrocyclones of a specific construction. The conical centrifuge units generally comprise a plurality of stages, as can be seen from FIG. 8 of the previously mentioned "Wochenblatt fur Papierfabrikation" article. For large quantities of waste paper, a plurality of the individual conical centrifuges illustrated in this FIG. 8 is generally provided. However, in previous systems of this type it has been found to be a disadvantage in that these conical centrifuge units are quite expensive in their construction, resulting in a considerable increase in the cost of the overall system. In addition, the multistage construction of these conical centrifuge units has been found to have the effect that a very large amount of fibers has to be discarded with the dirt, or that a relatively large quantity of coarse dirt remains in the fibrous suspension which passes to the stacking tower.

It is an object of the present invention to provide a system of the type illustrated in the article referred to which will produce a more pure fibrous substance in a more simple and therefore less costly manner, or, while maintaining the same degree of purity of the fibrous substance, substantially reduce the cost of the system.

According to the invention, there is provided a system for the processing of waste paper in which a fibrous suspension produced from waste paper is sorted and cleaned in a plurality of screen sorting devices to effect both coarse and fine cleaning and in one or more hydrocyclones, arranged in one or more stages, to effect fine cleaning, wherein the screen sorting devices intended for fine cleaning are arranged both in a main processing stream and in a subsidiary stream branching off from said mainstream, and said hydrocyclone or hydrocyclones intended for fine cleaning are exclusively arranged in said subsidiary stream; wherein said hydrocyclone or hydrocyclones is or are arranged in said subsidiary stream upstream of at least one screen sorting device; and wherein said subsidiary stream is arranged essentially to carry the portion with the greatest content of coarse material from the screen sorting device or devices in said mainstream intended for fine cleaning of the suspension in said mainstream.

BRIEF DESCRIPTION OF THE DRAWINGS

The above mentioned and other features and objects of this invention, and the manner of attaining them, will become more apparent and the invention itself will be better understood by reference to the following description of an embodiment of the invention taken in conjunction with the accompanying drawings, wherein.

DESCRIPTION OF A PREFERRED EMBODIMENT

In the figures, that part of the waste paper processing system which extends from the pulper in which the waste paper is disintegrated to the flotation system, if a flotation system is provided, has been omitted. As regards the design of this part of the system, reference may be made to known devices such as those earlier described.

Figure 1:
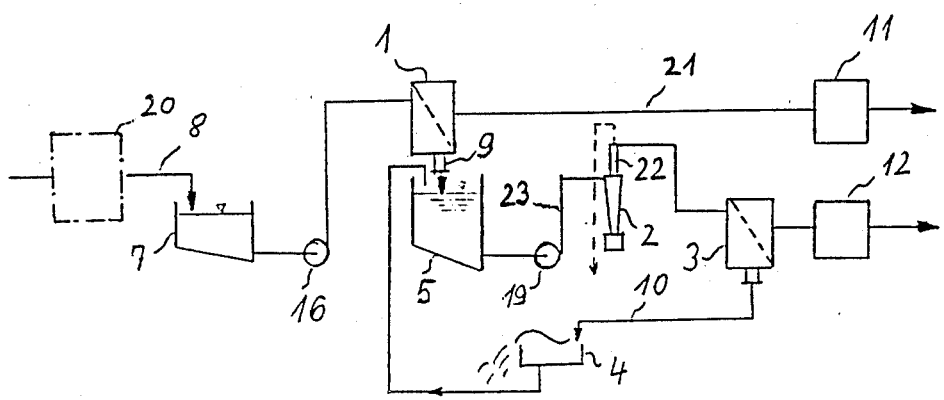
FIG. 1 is a schematic illustration of a preferred embodiment of the present invention.

In the embodiment of FIG. 1, the section of the system illustrated commences with flotation unit 20 represented in dash-dotted lines. From this unit 20, the fibrous suspension is fed through pipe 8 into container 7, whence it is conveyed by means of pump 16 to sorter 1 for fine cleaning. Sorter 1, and sorter 3 in the subsidiary stream, are of the type known by the technical name of "vertical sorters". These sorters 1, 3 are generally provided with a rotor which rotates about a vertical axis in a filter basket and which is provided with sorter vanes or strips (not shown). The size of the perforations in the filter basket is selected in accordance with the degree and nature of the impurities present and the degree of purity required after sorting. Sorters 1, 3 can be arranged in a plurality of stages, but generally in a maximum of two stages as explained in the book by Mack at pages 107 and 109. The construction of such devices is described, for example, in U.S. Pat. No. 4,276,159, which is incorporated by reference herein.

High quality material from sorter 1 is fed forward in a mainstream pipe 21 and, after thickening in a thickening device 11, for which known band pressure filters are used, is prepared for storage in a stacking tower (not shown). The overflow separated from sorter 1, which is enriched and abundant in coarse materials, is fed through outlet 9 into container 5 and thence conveyed by means of pump 19 as a subsidiary stream in subsidiary pipe 23 into conical centrifuge unit 2, which is schematically represented in the figures. The construction of conical centrifuge unit 2 corresponds to that shown in FIG. 8 of the article in "Wochenblatt fur Papierfabrikation" previously referred to, although each of the conical centrifuges (cleaners) represented therein can be replaced by a plurality thereof, if the quantity of waste paper to be processed is sufficiently large, which is generally the case. The construction of these conical centrifuges is described, for example, in German patent specification No. 1,442,503, incorporated by reference herein.

In FIG. 1, a broken line indicates that the light dirt portion is withdrawn through central collector pipe 22 which leads out of the top of conical centrifuge unit 2 or centrifuges 2. Previously, i.e., when the conical centrifuge unit 2 was arranged in the mainstream 21, it was necessary further to process this light dirt portion in order to prevent excessive further losses. In the system of the present invention, however, depending upon the quantity withdrawn from sorter 1, which can be adjusted by selecting the size of the perforations, i.e., the size of the holes or the slot width, of the filter basket, only an amount of at most 50% by volume of the total fibrous suspension is prepared in the subsidiary pipe 23 and thus in conical centrifuge unit 2. Generally the size of the subsidiary stream will be 20 to 30% by weight of the total fibrous suspension, and therefore for this reason along, a very much smaller amount of fibers is withdrawn with the light dirt portion from the hydrocyclones of the conical centrifuge unit.

It is also an advantage that the subsidiary stream is used to process a portion which is heavily enriched and abundant with dirt from the total amount of fibers, so that the degree of separation of these conical centrifuge units 2 is also substantially greater for the light dirt, which means that in the system of the present invention the light dirt portion withdrawn from conical centrifuge unit 2 can readily by discarded since the fiber losses are low. Since the amount of fibers to be processed is thus substantially smaller, a conical centrifuge unit 2 can also be smaller than in previously known systems in which the conical centrifuge unit was arranged in the mainstream. This in turn results in a substantial reduction in the cost of the overall system due to the fact that these conical centrifuges have a very high power requirement since they must operate at a high input pressure.

Downstream of conical centrifuge unit 2, the high quality material is collected and fed to sorter 3, similar to sorter 1 in mainstream 21. From sorter 3 the cleaned high quality material is collected for storage in the stacking tower after having been thickened in thickening device 12.

The overflow from sorter 3 is fed through pipe 10 via flat filter sorting device 4, downstream of which the separated waste liquid is discarded and the high quality material is returned to container 5 at the beginning of the subsidiary stream. Thus in this embodiment, the subsidiary stream begins at overflow outlet 9 of sorter 1 of the mainstream.

Figure 2:
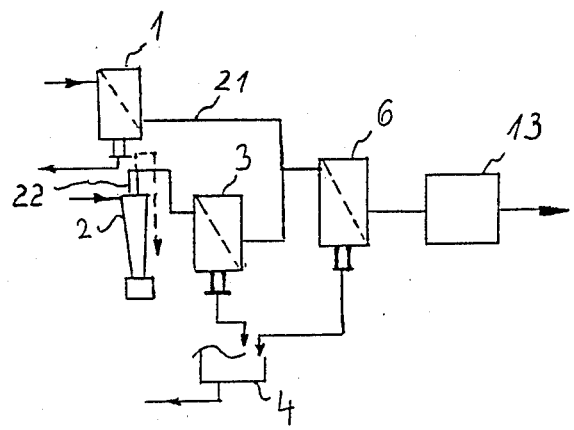
FIG. 2 is a schematic illustration of a modification of the embodiment in FIG. 1.

In FIG. 2, the upstream end of the system, i.e., elements 20, 8, 16, 1, 9, and 5, and their arrangement, is substantially the same as in the system of FIG. 1, and consequently, in FIG. 2 only the downstream end of the system has been illustrated. In FIG. 2, the main and subsidiary streams 21, 23, respectively, from sorters 1 and 3 are combined in vertical sorter 6 also similar to sorters 1 and 3, and then commonly run by way of thickening device 13 to the stacking tower (not shown). Naturally, it is also possible to combine the main and subsidiary streams 21, 23 in thickening device 13.

The conical centrifuges have already been referred to as known through the above-mentioned German Patent specification. It should also be noted that these conical centrifuges, which in English are often referred to as "cleaners", have a very slim or narrow conical lower part, the cone opening angle of which is generally less than ten degrees. At the tip of the cone they possess a waste liquid discharge nozzle and mainly serve to clean the suspension from very fine impurities in particle form, for example, sand, fine splinters, bark particles, and metal particles. These conical centrifuges operate at the optimum when the consistency of the fibrous suspension is below about 1% and preferably below about 0.8%. The maximum consistency which avoids too much disturbance of the operation is about 1.5%. It is also possible to use these conical centrifuges to degas the fibrous suspension. The high quality material is withdrawn from the center of the cleaning body upwardly to an annular chamber which is formed in a pipeline arranged at this point containing a central discharge pipe for the light dirt fraction and for gases.

While this invention has been described as having a preferred embodiment, it will be understood that it is capable of further modifications. This application is therefore intended to cover any variations, uses, or adaptations of the invention following the general principles thereof, and including such departures from the present disclosure as come within known or customary practice in the art to which this invention pertains and fall within the limits of the appended claims.

We claim:

1. An arrangement for cleaning fibrous suspension produced from waste paper comprising:
   a first screen sorting device in fluid communication with said fibrous suspension, whereby said suspension is separated into finely clean, and coarse suspension;
   a first conduit communicating with said first sorting device receiving said fine suspension;
   a second conduit communicating with said first sorting device receiving said coarse suspension;
   a cleaning hydrocyclone in communication with said second conduit whereby said coarse suspension is cleaned;
   a second screen sorting device in communication with said second conduit downstream from said cleaning hydrocyclone whereby high quality coarse suspension is separated from said coarse suspension; and, said second conduit is eventually recombined with said first conduit.

2. An arrangement of claim 1 wherein a plurality of cleaning hydrocyclones are in fluid communication with said second conduit.

3. The arrangement as claimed in claim 1 or claim 2 further comprising a return line in fluid communication with said second sorting device and said second conduit upstream from said hydrocyclone or hydrocyclones wherein the coarse suspension is received and travels therethrough.

4. The arrangement is claimed in claim 3 wherein said first and second conduit are recombined in a third fine cleaning screen sorting device.

5. An arrangement as claimed in claim 2 wherein said hydrocyclones are positioned in one or more stages.

6. An arrangement according to claim 3 wherein said first and second conduits are recombined upstream of a further fine cleaning screen sorting device.

7. An arrangement as claimed in claim 2 wherein each of said hydrocyclones is a conical cleaner.

8. An arrangement as claimed in claim 1, wherein said first and second conduits are recombined in a third fine cleaning screen sorting device.

9. An arrangement according to claim 1 wherein said first and second conduits are recombined upstream of a further fine cleaning screen sorting device.

10. An arrangement for cleaning fibrous suspension produced from waste paper comprising:
a first screen sorting device in fluid communication with said fibrous suspension, whereby said suspension is separated into finely clean, and coarse suspension;
a first conduit communicating with said first sorting device receiving said finely clean suspension;
a second conduit communicating with said first sorting device receiving said coarse suspension;
a cleaning hydrocyclone in communication with said second conduit whereby said coarse suspension is cleaned;
a second screen sorting device in communication with said second conduit downstream from said cleaning hydrocyclone whereby high quality coarse suspension is separated from said coarse suspension; and,
a return line conduit communicating between said second screen sorting device and said second conduit for communication of said coarse suspension to said second conduit.

11. The arrangement of claim 10 wherein a plurality of cleaning hydrocyclones are in fluid communication with said second conduit.

12. An arrangement as claimed in claim 11, wherein each of said hydrocyclones is a conical cleaner.

13. An arrangement as claimed in claim 10 or 11 wherein said first and second conduits are recombined in a third fine cleaning screen sorting device.

14. An arrangement according to claim 11 wherein said hydrocyclones are positioned in one or more stages.

15. An apparatus for cleaning and sorting a fibrous suspension of waste paper comprising:
a container for receiving a flow of fibrous suspension of waste paper, said container including an outlet;
a first vertical sorter having a inlet in fluid communication with said container outlet so as to receive the flow of fibrous suspension from said container, said first vertical sorter further including a first outlet through which high quality material sorted from the fibrous suspension exits said first vertical sorter, and said first vertical sorter further including a second outlet through which coarse materials sorted from the fibrous suspension exit said first vertical sorter;
a main stream pipe fluidly connecting said first outlet of said first vertical sorter with a first thickening device, and said first thickening device being in fluid communication with a stacking tower;
a hydrocyclone means for separating the fibrous suspension including an inlet in fluid communication with the second outlet of the first vertical sorter, said hydrocyclone means further including an outlet;
a second vertical sorter having an inlet in fluid communication with said outlet of said hydrocyclone means, said second vertical sorter having a first outlet in direct fluid communication with a second thickening device, said second thickening device being in fluid communication with the stacking tower, and said second vertical sorter having a second outlet in fluid communication with a filter sorting device, said filter sorting device being in fluid communication with said inlet of said hydrocyclone.

16. The apparatus of claim 15 wherein said first vertical sorter includes a filter basket having a plurality of apertures, said apertures are of a size so that between about 20 and about 30 weight percent of the fibrous suspension exits via said second outlet.

17. The apparatus of claim 16 wherein said hydrocyclone means further includes a second outlet through which a mixture of light dirt and a small amount of fibers that is separated from the fibrous suspension exits the apparatus to be discarded.

18. The apparatus of claim 15 wherein said first vertical sorter is adapted to fine clean the fibrous suspension.

19. The apparatus of claim 15 wherein said first vertical sorter includes a filter basket having a plurality of apertures, said apertures are of a size so that less than 50 percent by volume of the fibrous suspension exits via said second outlet.

20. An apparatus for cleaning and sorting a fibrous suspension of waste paper for passage to a storage stacking tower comprising;
a container means for receiving the fibrous suspension of waste paper;
a main processing conduit placing said container means in fluid communication with the storage stacking tower;
a first vertical sorter means, contained within said main processing conduit so as to be in fluid communication with said container means, for fine cleaning of the fibrous suspension into a portion of high quality material and a remaining portion having coarse materials contained therein, the high quality material exits into said main processing conduit;
a subsidiary processing conduit for receiving the remaining portion of the fibrous suspension from said first vertical sorter means, said subsidiary conduit means in fluid communication with the storage stacking tower;
a hydrocyclone means, contained in said subsidiary conduit means so as to receive the remaining portion of the fibrous suspension from said first vertical sorter means, for fine cleaning the remaining portion into a high quality portion and a remaining portion of a mixture of light dirt and a small amount of fibers, the high quality portion exits into said subsidiary processing conduit and the remaining portion is discarded; and a second vertical sorter means, contained in said subsidiary processing conduit so as to receive the high quality material separated by and exiting from said hydrocyclone means, for fine cleaning the fibrous suspension into a high quality portion and a remaining portion, the high quality portion exits into said subsidiary conduit and the remaining portion exits into a recycle conduit for eventual reentry into said hydrocyclone means.

21. The apparatus of claim 20 wherein said main and subsidiary processing conduits join together, and a third vertical sorter means, contained downstream of the joinder of the main and subsidiary processing conduits so as to receive the high quality material exiting from said first and second vertical sorter means, for fine cleaning the fibrous suspension.

22. The apparatus of claim 20 further including a filter sorting device contained in the recycle conduit.

* * * * *